United States Patent [19]
Takishima et al.

[11] Patent Number: 5,544,144
[45] Date of Patent: Aug. 6, 1996

[54] OPTICAL HEAD STRUCTURE HAVING COMPACTLY ARRANGED PARTS

[75] Inventors: Suguru Takishima, Hoya; Isao Okuda, Niiza; Takashi Morita, Higashimatsuyama, all of Japan

[73] Assignee: Asahi Kogaku Kogyo Kabushiki Kaisha, Tokyo, Japan

[21] Appl. No.: 556,829

[22] Filed: Nov. 2, 1995

Related U.S. Application Data

[63] Continuation of Ser. No. 204,890, Mar. 2, 1994, abandoned, which is a continuation of Ser. No. 13,179, Jan. 29, 1993, abandoned, which is a continuation of Ser. No. 612,818, Nov. 14, 1990, abandoned.

[51] Int. Cl.$^6$ .................................................. G11B 7/00
[52] U.S. Cl. ........................... 369/112; 369/116; 369/106
[58] Field of Search .................................. 369/116, 112, 369/106, 110, 100, 54; 358/342

[56] References Cited

U.S. PATENT DOCUMENTS

| | | | |
|---|---|---|---|
| 4,881,216 | 11/1989 | Deguchi et al. | 369/54 |
| 4,989,198 | 1/1991 | Kojima et al. | 369/116 |
| 5,067,117 | 11/1991 | Shimizu et al. | 369/116 |
| 5,073,888 | 12/1991 | Takahashi et al. | 369/112 |

FOREIGN PATENT DOCUMENTS

| | | |
|---|---|---|
| 59-195344 | 11/1984 | Japan . |
| 60-29947 | 2/1985 | Japan . |
| 61-112302 | 7/1986 | Japan . |

OTHER PUBLICATIONS

English Language translation of Japanese Provisional Publication No. SHO-59-195344.
English Language translation of Japanese Utility Model No. SHO-61-112302.
English Language translation of Japanese Provisional Publication No. SHO-60-29947.

*Primary Examiner*—Thai Q. Tran
*Assistant Examiner*—Robert Chevalier
*Attorney, Agent, or Firm*—Greenblum & Bernstein P.L.C.

[57] ABSTRACT

An optical head structure, employed in an optical device, in which light radiated from a predetermined light source is projected onto a predetermined recording medium through a light splitting member is disclosed. Part of the light is directed to the outside of the light splitting member and converged so as to be detected by a predetermined light detecting member. The light directed to the outside of the light splitting member is reflected at a predetermined angle by a predetermined light reflecting member. Thus, it becomes possible to make the whole volume of the optical device smaller. Also, the number of parts required in the optical head structure can be decreased.

29 Claims, 10 Drawing Sheets

OPTICAL HEAD STRUCTURE HAVING COMPACTLY ARRANGED PARTS

This application is a continuation of application Ser. No. 08/204,890, filed Mar. 2, 1994, now abandoned, which is a continuation of application Ser. No. 08/013,179, filed Jan. 29, 1993, now abandoned, which is a continuation of application Ser. No. 07/612,818, filed Nov. 14, 1990 now abandoned.

BACKGROUND OF THE INVENTION

The present invention relates to an optical head which is employable in an optical data recording/reproducing device for recording or erasing data on or from the data surface of the optical disk by converging a laser beam radiated from a laser beam source to the data surface of an optical disk through an optical system, and reading recorded data by detecting a laser beam reflected at the data surface.

A conventional system of an optical head to be provided within an optical disk type data recording/reproducing device and the like has been arranged as shown in FIG. 1.

In this type of optical head, a laser beam radiated from a semiconductor laser 1 is made in to a parallel luminous flux by a collimator lens 2, and passes through a beam splitter 4 as a beam splitting element with which a prism 3 for converting an elliptic shape in a cross section of the laser beam into a circular shape is integrally formed, further reflected by an erecting mirror 5 to be directed in the direction of an optical disk 10 as well as converged on and projected to the data signal recording surface on the optical disk 10 by an objective lens 6.

Data is recorded by physically or chemically changing the data signal recording surface by a laser beam energy projected onto the surface, and data is read or reproduced in such a manner that a laser beam, which is reflected at the data signal recording surface and reversely travels a path along which the laser beam has previously traveled, is reflected at a right angle by the half mirror surface 4a of the beam splitter 4 and reaches a photo detector (not shown) after passing through a phase plate, i.e., (½)λ plate 9, so that the laser beam is detected by the photo detector to provide a reproducing signal. Note that a tracking error signal and focusing error signal are obtained from the photo detector in addition to the reproducing signal, and an operation of the optical head is controlled so as to be located at the desired position based on these error signals.

With the above-described arrangement of such an optical head, the beam splitter 4 having a transmittance of 60 through 80%, and thus when the laser beam radiated from the semiconductor laser 1 passes through the beam splitter 4, a part, i.e., 20 through 40%, thereof is reflected at the half mirror surface 4a and directed to the outside of the beam splitter 4. The laser beam having been reflected and directed to the outside of the beam splitter 4 does not contribute to record and reproduce data, but it is converged on a monitoring photo detector 8 by a monitoring converging lens 7 and an output signal corresponding to the converged laser beam from the monitoring photo detector 8 is fed back so as to control an operation of the semiconductor laser 1 to thereby provide a stable laser beam output.

More specifically, an amount of the luminous flux directed to the outside of the beam splitter 4 is proportional to an amount of a laser beam radiated from the semiconductor laser 1, and thus the laser beam output of the semiconductor laser 1 can be controlled so as to be made stable in accordance with an amount of the luminous flux detected by the monitoring photo detector 8.

Nevertheless, with the above-described arrangement, a problem arises in that the optical head is made large as a whole, because, as shown in FIG. 2 which is a cross sectional view taken along the line I—I of FIG. 1, the monitoring converging lens 7 is disposed in the vicinity of the beam splitter 4 and the monitoring photo detector 8 must be disposed at the focusing position of the converging lens 7, and these parts for monitoring must be arranged not to interfere with an actuator and the like of the objective lens. Further, it is necessary to combine a multiplicity of constituting parts with high accuracy, thus, production cost becomes expensive.

SUMMARY OF THE INVENTION

It is therefore an object of the invention to provide an improved optical head which is employable in an optical data recording/reproducing device, wherein available space is increased in the vicinity of a beam splitter by three-dimensionally arranging parts for monitoring, such as a converging lens, monitoring photo detector and the like, and an optical head can be made smaller overall.

For this purpose, according to the present invention, there is provided an optical head structure, employed in an optical device, in which light radiated from a predetermined light source is projected onto a predetermined recording medium through a light splitting member, a part of the light being directed to the outside of said light splitting member and converged so as to be detected by a predetermined light detecting member.

An improvement is that the light directed to the outside of said light splitting member is reflected at a predetermined angle by a predetermined light reflecting member.

DESCRIPTION OF THE ACCOMPANYING DRAWINGS

Figure 7:
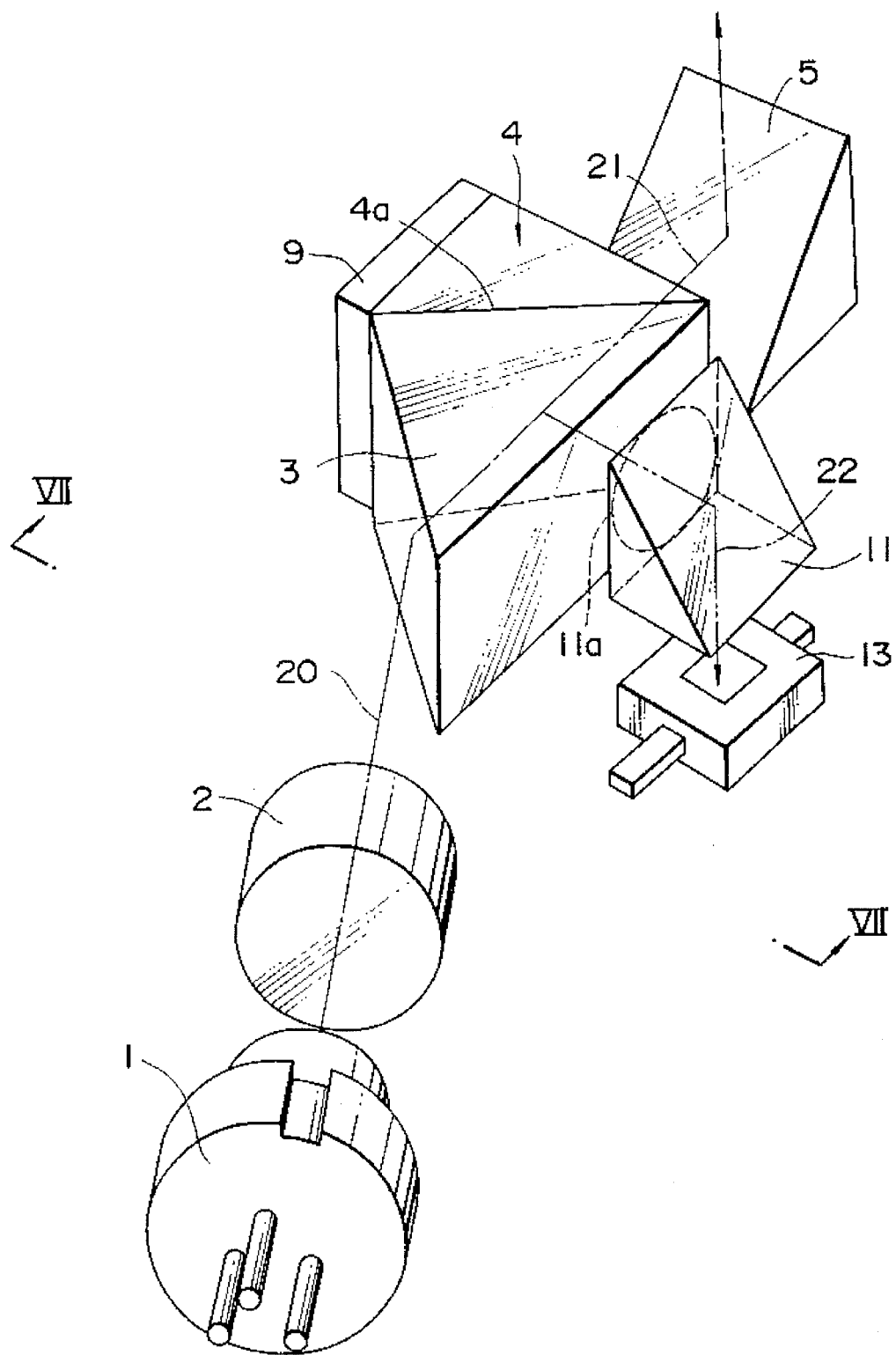
FIG. 7 is a plan view of yet another embodiment of the optical head structure according to the present invention.
Figure 9A:
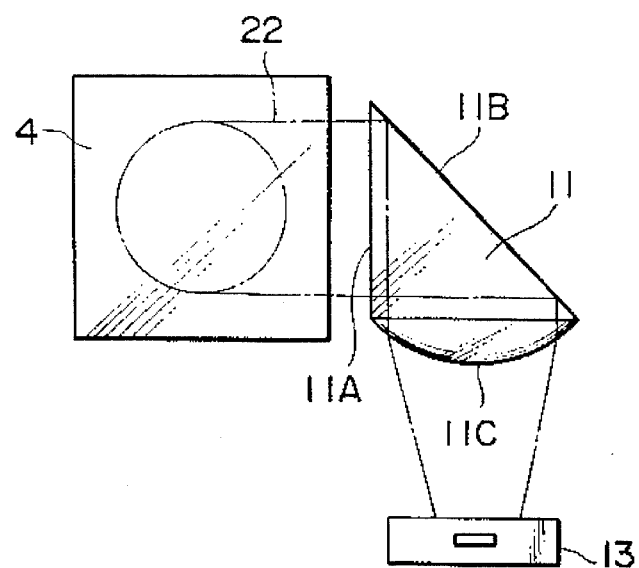
Figure 9B:
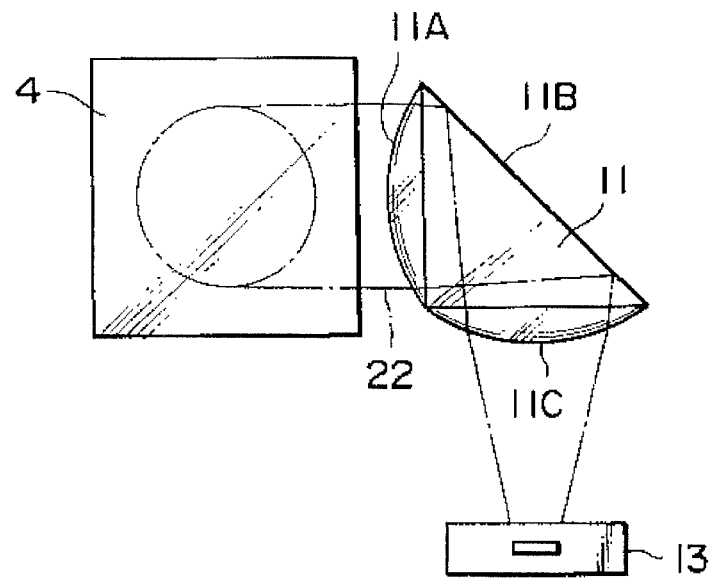
Figure 9C:
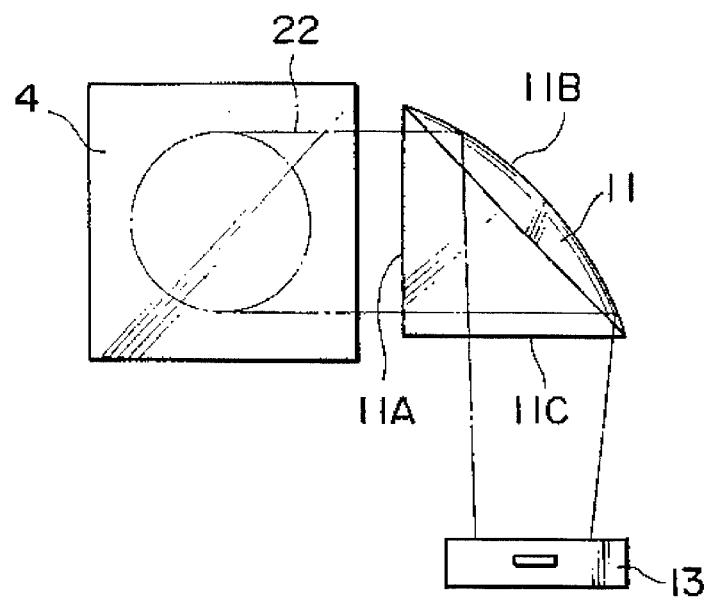
Figure 10:
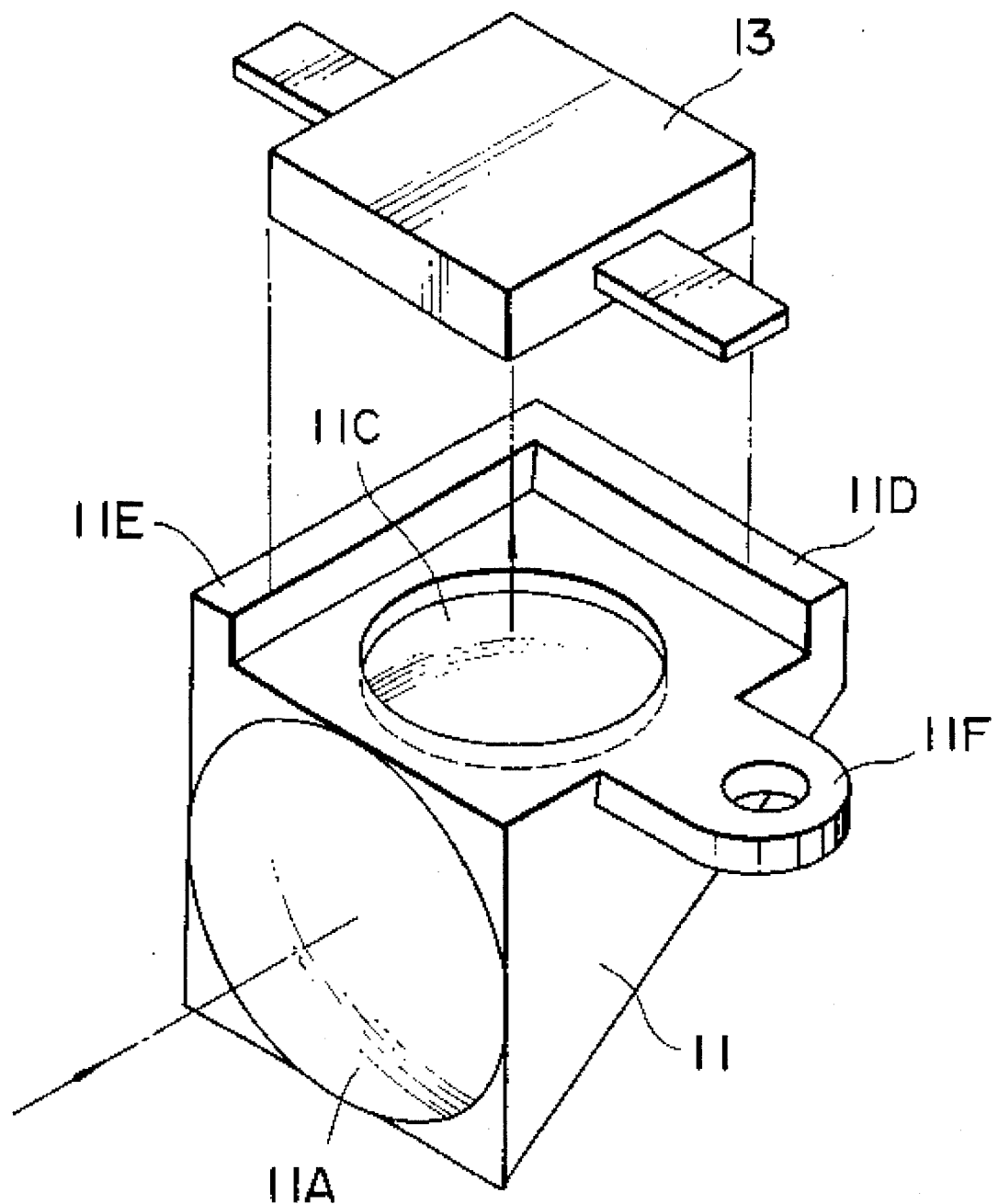

FIGS. 9A through 9C respectively show cross sectional views of another embodiment of the optical head structure shown in FIG. 7 and FIG. 10 shows a perspective view showing a connecting mechanism for connecting a photo-diode and a reflecting prism respectively included in the optical head structure according to the present invention.

DESCRIPTION OF THE EMBODIMENTS

Referring to the drawings, embodiments of the present invention will be described hereinafter.

Figure 1:
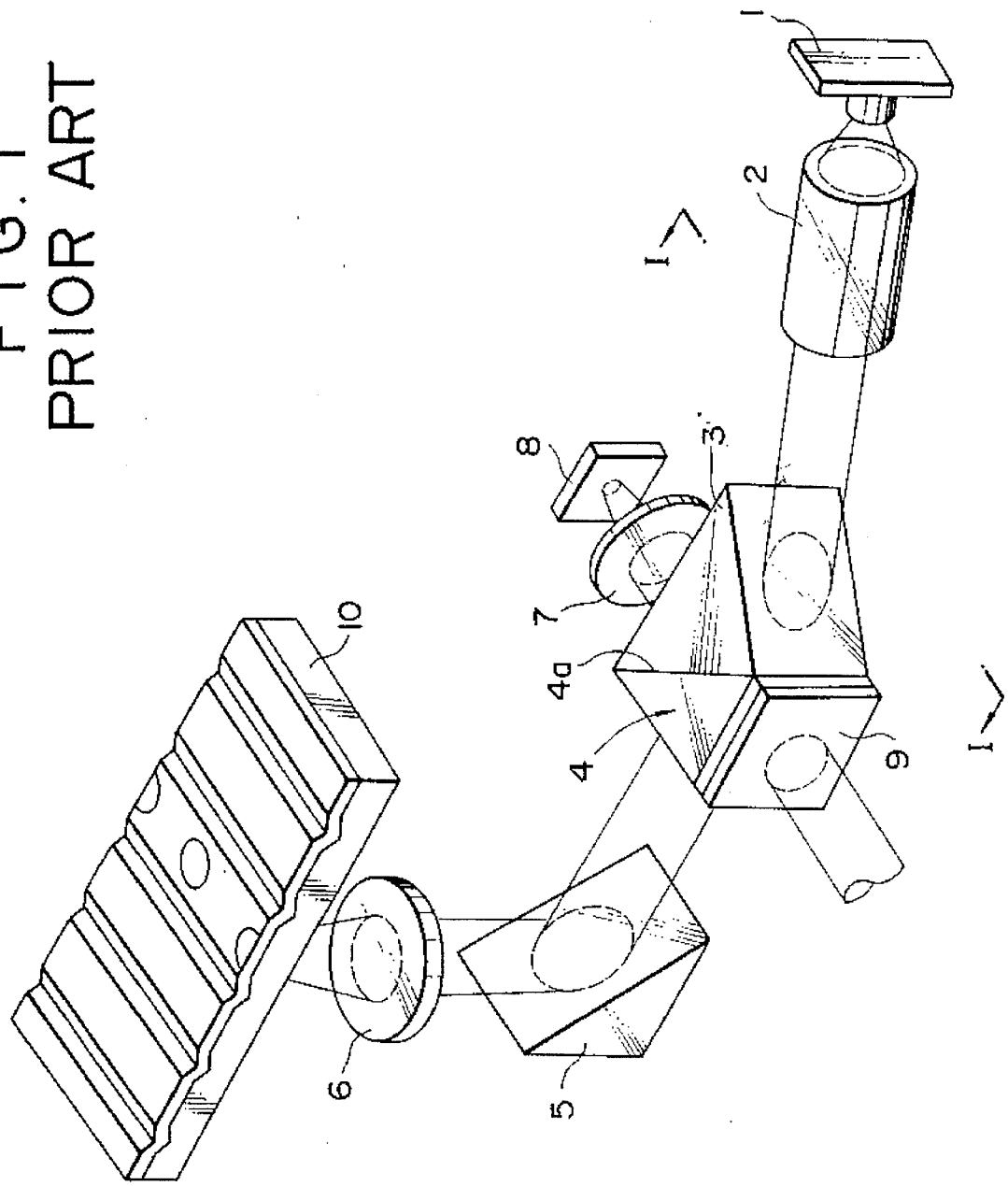
FIG. 1 is a perspective view of a conventional optical head structure.
Figure 2:
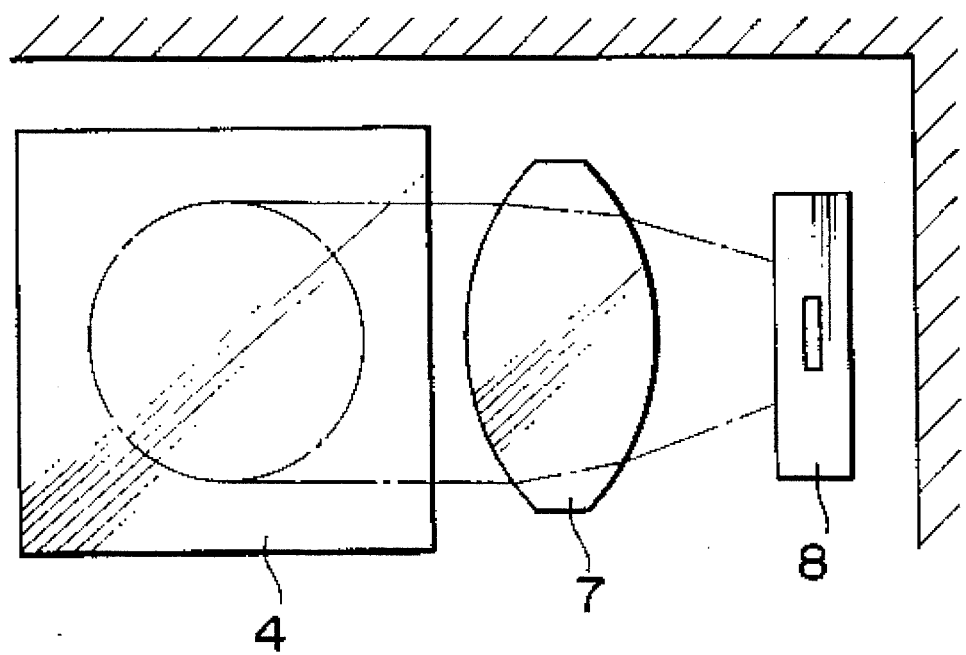
FIG. 2 is a cross sectional view taken along the line I—I of FIG. 1.
Figure 3:
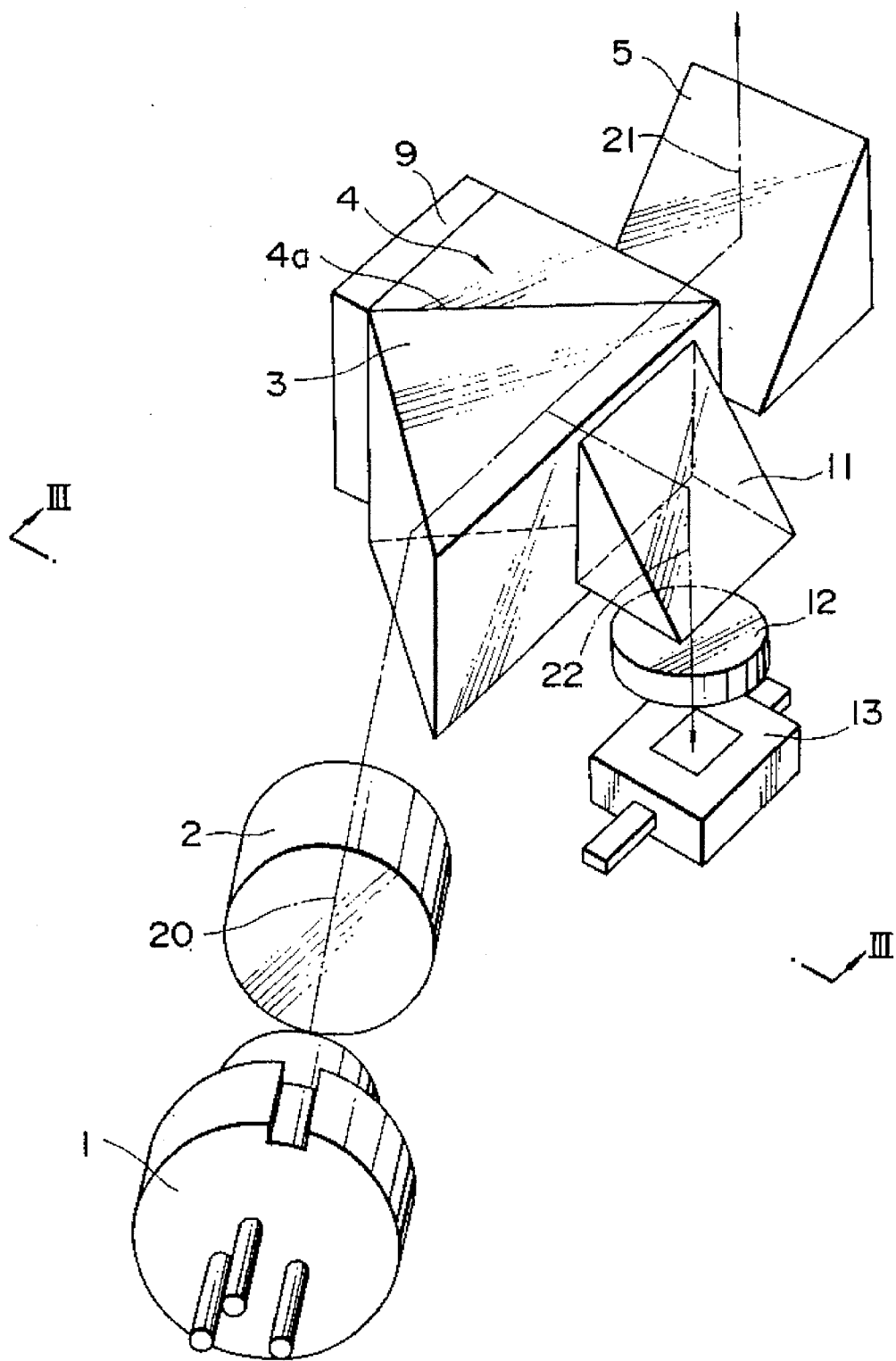
FIG. 3 is a perspective view showing a schematic arrangement of an embodiment of an optical head structure according to the present invention which is employable in an optical data recording/reproducing device.

FIG. 3 is a perspective view showing a schematic arrangement of an embodiment of an optical head structure which is employable in an optical data recording/reproducing device.

The optical head structure shown in FIG. 3 comprises a semiconductor laser 1 for radiating a laser beam 20, a collimator lens 2, and beam splitter 4 which splits the laser beam 20 having been passed through the collimator lens 2 integrally formed with a prism 3 for converting an elliptic shape of a cross section of the laser beam 20 having been radiated from the semiconductor laser 1 into a circular shape, and these elements are arranged in series. An erecting mirror 5 is disposed on the side of the beam splitter 4, for upwardly directing the laser beam 21 having entered into the prism 3. Further, a totally reflecting prism 11 for reflecting the laser beam is disposed on the side of the beam splitter 4 from which a part of the laser beam 20 radiated from the semiconductor laser 1 is projected by being reflected at the half mirror surface 4a thereof, and a converging lens 12 and a monitoring photo-diode 13 are arranged in series along a path of the laser beam reflected by the totally reflecting prism 11. In addition, a phase plate 9, i.e., (½)λ plate, is disposed on the side of the beam splitter 4 opposite to the side thereof where the totally reflecting prism 11 is disposed.

The totally reflecting prism 11 is a so-called right angle prism, and is disposed such that a laser beam 22 reflected at the beam splitter 4 is downwardly reflected substantially at right angles, and the converging lens 12 and the monitoring photo diode 13 are arranged in series along an optical path of the laser beam 22 reflected by the totally reflecting prism 11.

An output from the monitoring photo diode 13 is fed back to a conventional control unit (not shown) of the semiconductor laser 1, to thereby to control an amount of the output of the semiconductor laser 1.

With the optical head arranged as described above, the laser beam 20 radiated from the semiconductor laser 1 is converted to a parallel luminous flux by the collimator lens 2 and incident on the beam splitter 4 from the prism 3 side.

Note that an elliptic shape in a cross section of the laser beam is converted into a circular shape by the prism 3, and the laser beam is caused to pass through or reflect at the half mirror 4a in a predetermined ratio of an amount of the laser beam (e.g., passing through laser beam: 60 through 80%; reflecting laser beam: 40 through 20%).

A passing through laser beam 21 having been passed through the half mirror surface 4a is projected from the beam splitter 4, reflected at the erecting prism 5, then converged by an objective lens (not shown), so that the laser beam 21 is converged on and projected to the data recording surface of an optical disk (not shown).

A reflected laser beam 22 reflected at the half mirror surface 4a and directed to the outside of the beam splitter 4 is reflected downwardly at the totally reflecting prism, then converged by the converging lens 12, and thus is incident on the monitoring photo diode 13.

An amount of the laser beam incident on the monitoring photo-diode 13 is in proportion to an amount of the laser beam radiated from the semiconductor laser 1. Therefore, an amount of the laser beam radiated from the semiconductor laser 1 can be accurately determined by a signal outputted from the monitoring photo diode 13 corresponding to the laser beam 22 detected by the photo-diode 13, and thus the desired predetermined amount of a laser beam can be obtained by controlling the semiconductor laser 1 based on the output signal fed back thereto. Further, since no beam returning from the optical disk is incident on the monitoring photo diode 13, the semiconductor laser 1 can be stably controlled without being affected by disturbance.

Figure 4:
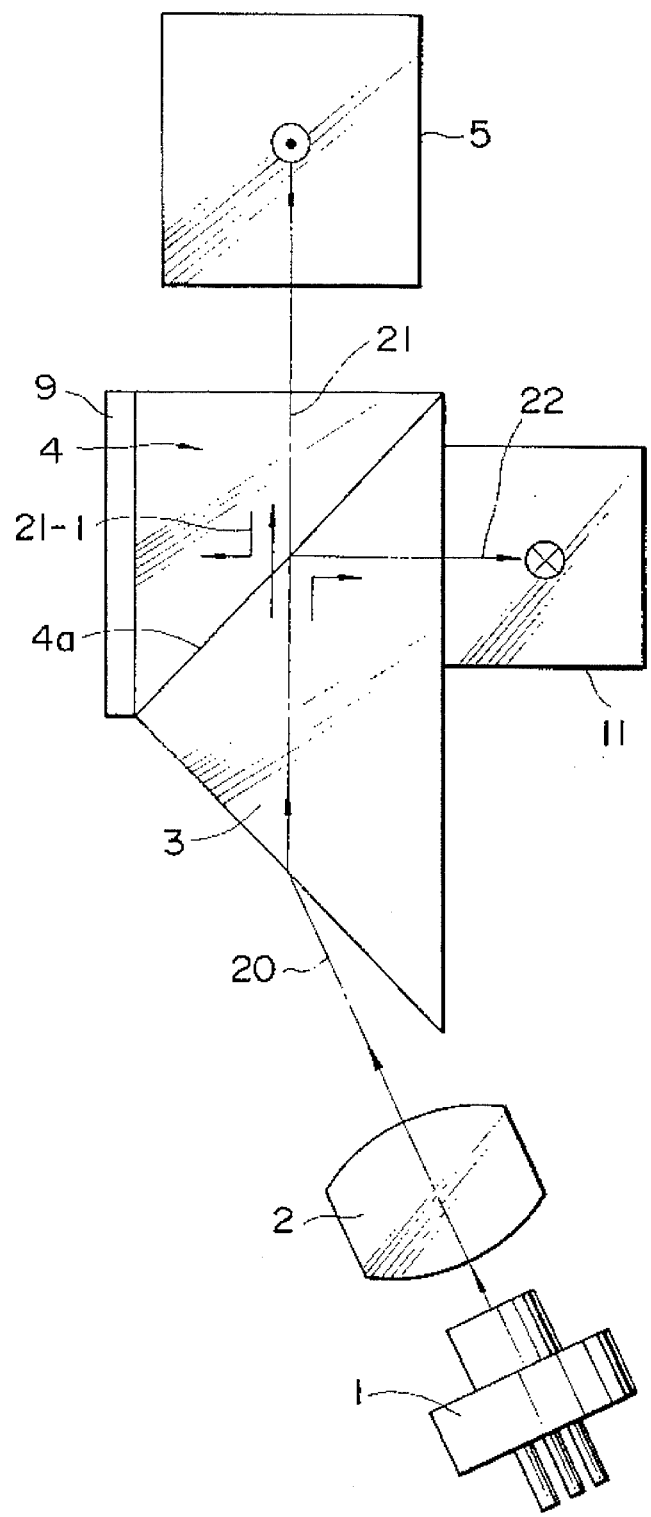
FIG. 4 is a plan view of the optical head structure shown in FIG. 3.

Note that the passing through laser beam 21, which is caused to pass through the beam splitter 4 and converged on and projected to the data signal recording surface of the optical disk, records data by physically or chemically changing the data signal recording surface by laser beam energy, and reads, i.e., reproduces, as shown in FIG. 4, data through a photo diode (not shown) for detecting a reproducing signal in such a manner that a laser beam 21-1, which is reflected at the data signal recording surface and reversely travels a path it previously traveled, is reflected at right angles at the half mirror surface 4a of the beam splitter 4 and reaches the photo detector (not shown) after passing through a phase plate 9.

Figure 5:
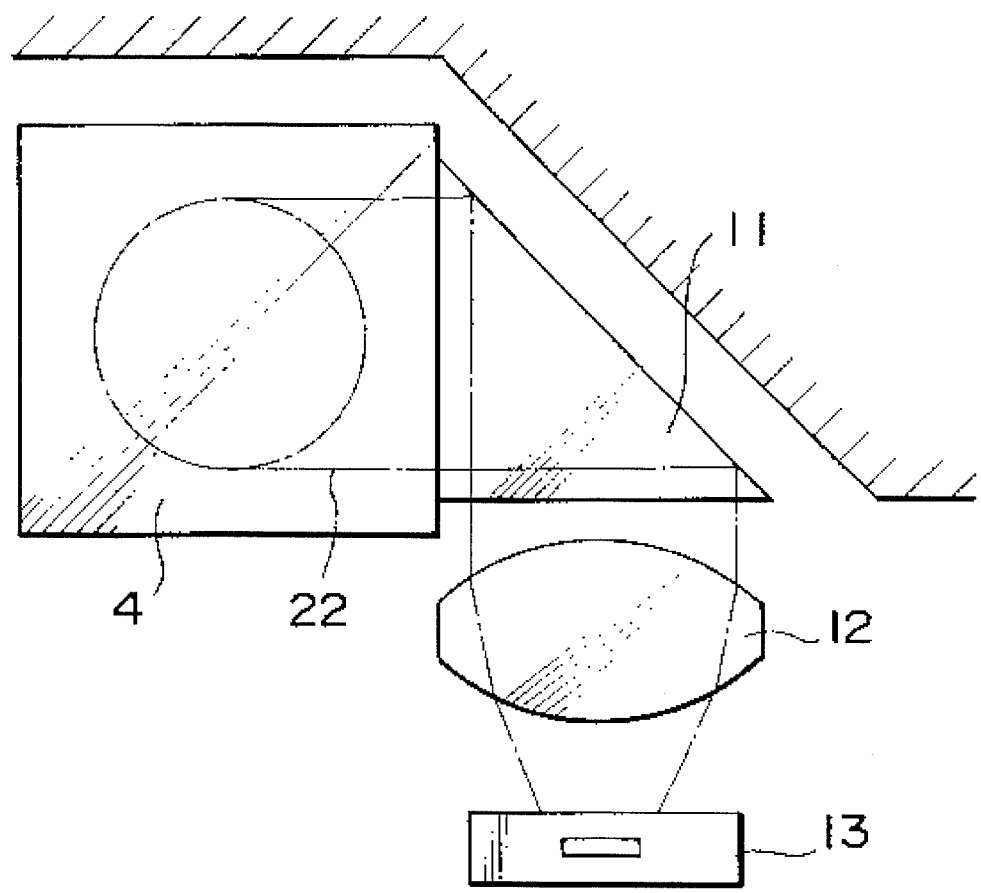
FIG. 5 is a cross sectional view taken along the line III—III of FIG. 3.

With the arrangement as described above, parts can be easily disposed in the vicinity of the beam splitter 4, an available space shown by hatching in FIG. 5 is increased, and the flat configuration of the entire optical head can be made compact, as shown in FIG. 5 which is a cross section of FIG. 3 taken along the line III—III.

Figure 6:
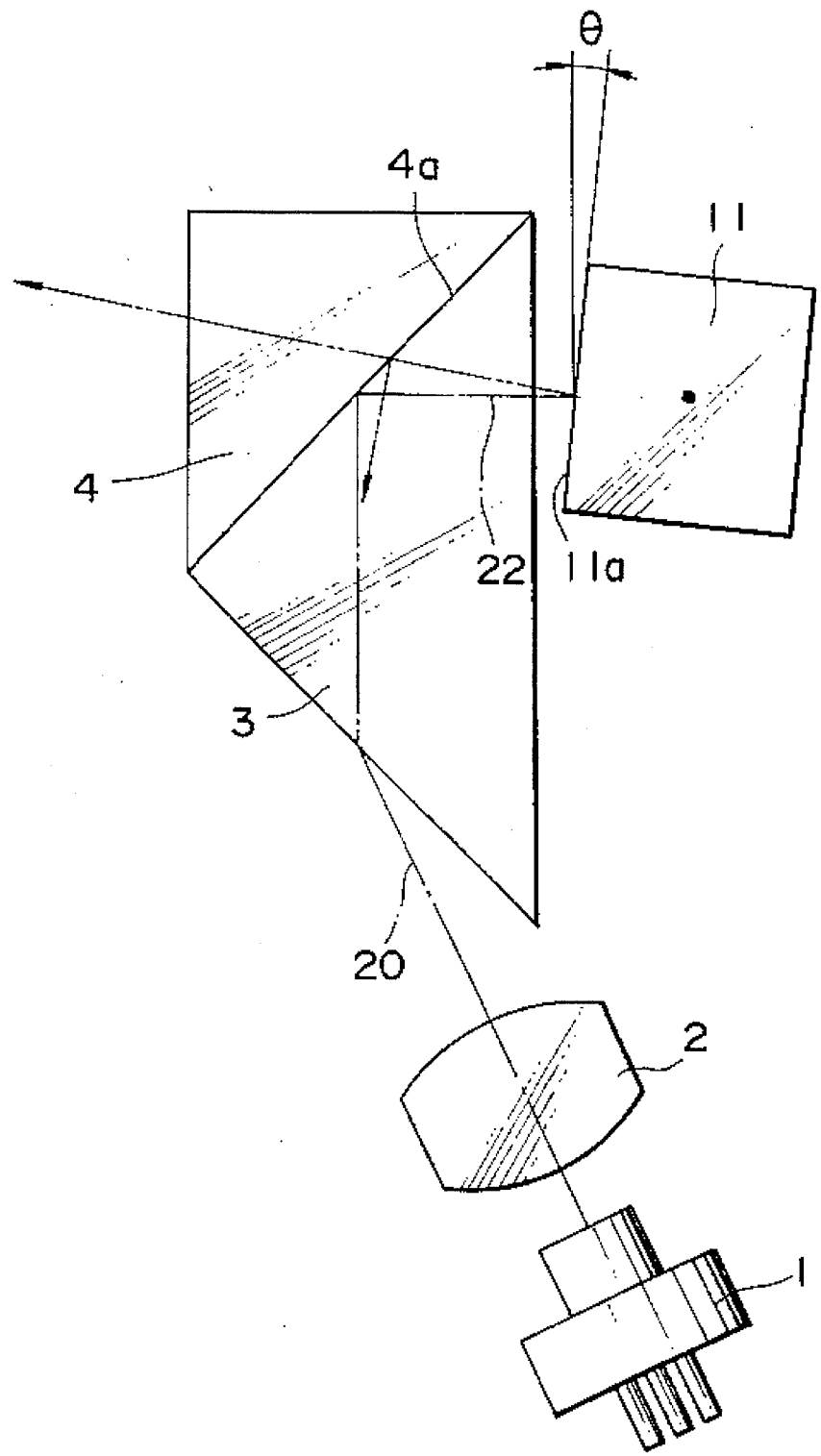
FIG. 6 is a plan view of another embodiment of the optical head structure according to the present invention.

Next, an improved embodiment of the present invention will be described below with reference to FIG. 6 showing a plan view thereof.

In this improved embodiment, the totally reflecting prism 11 disposed on the reflected laser beam projecting side of the beam splitter 4 is arranged such that the incident surface 11a thereof is inclined by a predetermined angle ($\theta=1$ to $2°$) with respect to an axis perpendicular to the axis of the reflected laser beam rather than normal to the axis as in the previous embodiment. With this arrangement, since a slight part of the laser beam 22 which is reflected at the reflecting surface 11a is not entered into the not shown photo detector for providing a reproducing signal, is prevented from the reproducing signal being affected by the reflected laser beam. Further, since the above-described reflected laser beam at the incident surface 11a is not returned to the semiconductor laser 1, generation of noise is prevented.

Referring to the drawings of FIGS. 7 and 8, another embodiment of the present invention will be described hereinafter.

Figure 8:
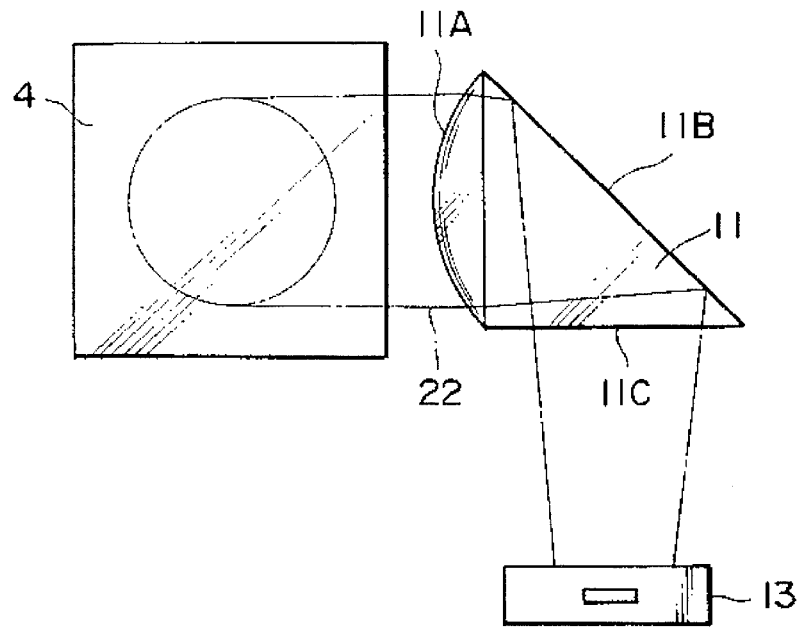
FIG. 8 shows a cross sectional view taken along the line VII—VII of FIG. 7.

FIG. 7 shows a perspective view of another embodiment and FIG. 8 shows a view taken along the line VII—VII of FIG. 7.

In this embodiment, a totally reflecting prism 11 comprises a right angle prism made of a so-called optical plastic material such as polymethylmetacrylate (PMMA), styrene-acrylonitrile (SAN), polycarbonate (PC), and a surface 11A through which the light enters into the reflecting prism 11 which is formed as a convex surface having a predetermined curvature. As shown in FIG. 8, the light entering into the reflecting prism 11 is converged by the convex surface 11A, reflected by the reflecting surface 11B and is downwardly directed. In other words, the reflecting prism 11 has a light reflecting function as well as a light converging function. The light passed through the reflecting prism 11 is detected by the monitoring photo-diode 13. By employing the above-described arrangement, it becomes possible to decrease a number of constituting parts, and becomes possible to decrease the whole volume of a device within which the optical head structure is provided.

FIGS. 9A through 9C respectively show other structures of the reflecting prism 11. FIG. 9A shows a reflecting prism 11 arranged in such a manner that a surface 11C through which the light is passed out therefrom is formed as a convex surface. FIG. 9B shows a structure in which the surface 11A as well as the surface 11C are formed as convex surfaces. Further, FIG. 9C shows a structure in which the reflecting surface of the prism 11 is formed as a concave surface.

In these above-described structures, the light entering into the reflecting prism 11 is converged and downwardly directed, and detected by the monitoring photo-diode 13.

FIG. 10 shows a reflecting prism 11 including position designating portions 11D, 11E, integrally formed on the reflecting prism 11, by which a positional relationship between the reflecting prism 11 and the monitoring photo-diode 13 is determined. In other words, the monitoring photo-diode 13 is located along the position designating portions 11D, 11E, and fixed to the reflecting prism 11 by means of a predetermined manner such as screw members, not shown. Further, the reflecting prism 11 includes a connecting portion 11F by which the reflecting prism 11 is fixed to a chassis of the device.

In this arrangement, it becomes possible to accurately designate a positional relationship between the reflecting prism 11 and the monitoring photo-diode 13 with a simple structure, and to easily produce the optical head. Further, it becomes possible to fix the reflecting prism 11 to the device together with the monitoring photo-diode 13, and then, a number of constituting parts as well as the production cost can be decreased.

According to the optical head structure of the present invention, a freedom of design such as the arrangement of constituting parts and the like is increased and a space in the vicinity of a beam splitter conventionally occupied by a converging lens and monitoring laser beam detector can be effectively used. Further, a flat configuration of the entire optical head can be made compact.

The present disclosure relates to subject matter contained in Japanese patent application No. 63-157334 and 63-157335, both filed on Dec. 2, 1986, which are expressly incorporated herein by reference in their entireties.

What is claimed is:

1. An optical head structure, employed in an optical device, comprising:

means for emitting a light beam along an optical axis;

means for splitting said light beam into a first light beam and a second light beam, an optical path of said first light beam and said optical axis defining a first plane;

means for reflecting said first light beam to define a reflected first light beam extending out of said first plane along an optical path within a second plane, said reflecting means having an incident surface and a reflecting surface distinct from said incident surface, said incident surface inclined by a predetermined angle with respect to an axis perpendicular to said optical path of said first light beam emitted from an emitting face of said splitting means, said second plane intersecting said first plane and being distinct from said first plane; and means for receiving said reflected first light beam, said receiving means outputting a signal proportional to an intensity of said reflected first light beam.

2. The optical head structure according to claim 1, wherein said emitting means comprises a semiconductor laser.

3. The optical head structure according to claim 1, an output magnitude of said emitting means being controlled in accordance with an amount of light detected by said receiving means.

4. The optical head structure according to claim 1, optical paths of said first light beam, said second light beam, and said reflected first light beam being substantially orthogonal with respect to each other.

5. The optical head structure according to claim 1, further comprising a converging lens positioned between said reflecting means and said receiving means.

6. The optical head structure according to claim 1, said receiving means positioned in a plane beneath said first plane.

7. The optical head structure according to claim 1, said receiving means positioned in a plane beneath said first plane, and a recording medium, towards which said second light beam is directed, positioned in a plane above said first plane.

8. The optical head structure according to claim 1, said means for reflecting said first light beam comprising a reflecting prism.

9. The optical head structure according to claim 8, wherein a position designating portion at which a positional relationship between said reflecting prism and said receiving means is designated is provided on said reflecting prism.

10. The optical head structure according to claim 8, wherein a connecting portion, for fixing said reflecting prism to said optical device, is provided on said reflecting prism.

11. The optical head structure according to claim 8, said reflecting prism being mounted to an emitting surface of said splitting means, through which said first light beam is emitted from said splitting means.

12. The optical head structure according to claim 8, said reflecting prism reflecting said first light beam at substantially a right angle.

13. The optical head structure according to claim 8, wherein said reflecting prism comprises an optical plastic.

14. The optical head structure according to claim 13, wherein said optical plastic comprises a predetermined material selected from the group of materials consisting of polymethlmethacrylate, styreneacrylonitrile, and polycarbonate.

15. The optical head structure according to claim 13, wherein a convex surface having a predetermined curvature is formed on at least one surface of said reflecting prism through which the light is passed.

16. The optical head structure according to claim 13, wherein a concave surface having a predetermined curvature is formed on a reflecting surface at which the light reflecting is reflected.

17. An optical head structure employed in an optical device, comprising:

means for emitting a light beam along an optical axis;

means for splitting said light beam into a first light beam and a second light beam, an optical path of said first light beam and said optical axis defining a first plane;

means for reflecting said first light beam to define a reflected first light beam, said reflecting means having an incident surface, and a reflecting surface distinct from said incident surface, said incident surface inclined by a predetermined angle with respect to an axis perpendicular to said optical path of said first light beam emitted from an emitting face of said splitting means;

means for reflecting said second light beam to define a reflected second light beam;

said first light beam and said reflected first light beam defining a second plane, said second light beam and said reflected second light beam defining a third plane, said second and third planes each being distinct and intersecting said first plane; and means for receiving said reflected first light beam, said receiving means outputting a signal which is proportional to an intensity of said reflected first light.

18. The optical head structure according to claim 17, wherein said emitting means comprises a semiconductor laser.

19. The optical head structure according to claim 17, wherein said reflecting means comprises a reflecting prism made of an optical plastic.

20. The optical head structure according to claim 19, wherein said optical plastic is selected from a group of materials consisting of polymethylmethacrylate styrene-acrylonitrile, and polycarbonate.

21. The optical head structure according to claim 19, wherein a convex surface having a predetermined curvature is formed on at least one surface of said reflecting prism through which said first light beam is passed.

22. The optical head structure according to claim 19, wherein a concave surface having a predetermined curvature is formed on a reflecting surface of said reflecting prism at which said first light beam entering into said reflecting prism is reflected.

23. The optical head structure according to claim 17, said receiving means positioned in a plane beneath said first plane.

24. The optical head structure according to claim 17, optical paths of said first light beam, said second light beam, and said reflected first light beam being substantially orthogonal with respect to each other.

25. An optical head structure, employed in an optical device, comprising:

means for emitting a light beam;

means for splitting said light beam into a first light beam and a second light beam, an optical path of said first light beam extending traversely to a path of said second light beam;

means for reflecting said first light beam to define a reflected first light beam, said reflecting means having an incident surface and a reflecting surface distinct from said incident surface, said incident surface inclined by a predetermined angle with respect to an axis perpendicular to the optical path of said first light beam emitted from an emitting face of said splitting means; and means for receiving said reflected first light beam, said receiving means outputting a signal which is proportional to an intensity of said reflected first light, said receiving means extending within a plane substantially parallel to a plane defined by said first and second light beams.

26. The optical head structure according to claim 25, wherein said emitting means comprises a semiconductor laser.

27. The optical head structure according to claim 26, wherein an amount of output of said semiconductor laser is controlled in accordance with an amount of light detected by said receiving means.

28. The optical head structure according to claims 25, optical paths of said first light beam, said second light beam, and said reflected first light beam being substantially orthogonal with respect to each other.

29. The optical head structure according to claim 25, said receiving means positioned in a plane beneath said first plane.

\* \* \* \* \*

UNITED STATES PATENT AND TRADEMARK OFFICE
CERTIFICATE OF CORRECTION

PATENT NO. : 5,544,144
DATED : August 6, 1996
INVENTOR(S) : S. TAKISHIMA et al.

It is certified that error appears in the above-indentified patent and that said Letters Patent is hereby corrected as shown below:

On the title page, in section [75], "Inventors", line 1, change "Hoya" to ---Tokyo---.

On the title page, in section [75], "Inventors", line 2, change "Niiza" to ---Saitama---.

On the title page, in section [75], "Inventors", line 3, change "Higashimatsuyama" to ---Saitama---.

At column 6, line 39 (claim 14, line 4), change "polymethlmethacrylate" to ---polymethylmethacrylate---.

At column 6, line 47 (claim 16, line 3), delete "reflecting" (second occurrence).

Signed and Sealed this

Twenty-fifth Day of November, 1997

Attest:

BRUCE LEHMAN

*Attesting Officer*                *Commissioner of Patents and Trademarks*